US 6,567,579 B2

(12) United States Patent
Foltzer

(10) Patent No.: US 6,567,579 B2
(45) Date of Patent: May 20, 2003

(54) MULTI-CHANNEL, MULTI-MODE REDUNDANT OPTICAL LOCAL LOOP HAVING A BUS TOPOLOGY

(75) Inventor: Lawrence E. Foltzer, Occidential, CA (US)

(73) Assignee: Alcatel, Paris (FR)

(*) Notice: Subject to any disclaimer, the term of this patent is extended or adjusted under 35 U.S.C. 154(b) by 68 days.

(21) Appl. No.: 09/738,223

(22) Filed: Dec. 15, 2000

(65) Prior Publication Data

US 2002/0076143 A1 Jun. 20, 2002

(51) Int. Cl.$^7$ .................................................. G02B 6/28
(52) U.S. Cl. ....................... 385/24; 359/115; 359/118; 359/125; 359/164
(58) Field of Search ........................... 384/24; 359/115, 359/118, 125, 164

(56) References Cited

U.S. PATENT DOCUMENTS

| 4,317,614 A | * | 3/1982 | Palmer | 250/227.24 |
|---|---|---|---|---|
| 4,662,715 A | * | 5/1987 | Shutterly | 359/115 |
| 4,707,061 A | * | 11/1987 | McMahon | 372/18 |
| 5,175,777 A | * | 12/1992 | Bottle | 359/115 |
| 5,327,423 A | * | 7/1994 | Audouin et al. | 359/121 |
| 5,479,082 A | * | 12/1995 | Calvani et al. | 359/119 |
| 5,510,917 A | * | 4/1996 | Corke et al. | 359/110 |
| 5,717,795 A | * | 2/1998 | Sharma et al. | 359/124 |
| 5,748,815 A | * | 5/1998 | Hamel et al. | 359/118 |
| 5,793,909 A | * | 8/1998 | Leone et al. | 385/134 |
| 5,898,801 A | * | 4/1999 | Braun et al. | 359/119 |
| 5,969,836 A |   | 10/1999 | Foltzer | 359/114 |
| 6,038,357 A | * | 3/2000 | Pan | 359/124 |
| 6,141,125 A | * | 10/2000 | Blair et al. | 359/110 |
| 6,208,441 B1 | * | 3/2001 | Jones et al. | 359/124 |
| 6,211,980 B1 | * | 4/2001 | Terahara | 359/124 |
| 6,323,975 B1 | * | 11/2001 | Kurki | 359/127 |
| 6,377,725 B1 | * | 4/2002 | Stevens et al. | 359/124 |
| 2002/0101636 A1 | * | 8/2002 | Xiao et al. | 359/127 |

OTHER PUBLICATIONS

"Passive Optical Network (PON) Systems"; 3 pages; Oct. 29, 2000. [www.swt.iao.fhg.de/eurorim/guidelines/siig2/architectures22].

* cited by examiner

Primary Examiner—Akm E. Ullah
Assistant Examiner—Daniel Valencia
(74) Attorney, Agent, or Firm—Danamaraj & Youst, P.C.; V. Lawrence Sewell; Jessica W. Smith

(57) ABSTRACT

An optical local loop having a bus topology with a pair of optical fibers disposed among a plurality of Optical Network Units (ONUs). A Host Digital Terminal (HDT) is disposed at the head end of the optical local loop for concentrating optical signals for a network. Redundant transceiver banks are provided within the HDT for operating with the optical signals effectuated at a plurality of wavelengths which are multiplexed and de-multiplexed via a pair of Wavelength Division Multiplex (WDM) couplers disposed on corresponding optical fibers. During transmission, the ONUs excite both optical fibers and the received optical signals are monitored in the HDT for quality and integrity of the optical paths. A selectively actuatable mechanism is provided in the HDT to switch downstream transmission to the ONU nodes from one optical path to the other optical path of the local loop based on the path quality and integrity.

22 Claims, 3 Drawing Sheets

MULTI-CHANNEL, MULTI-MODE REDUNDANT OPTICAL LOCAL LOOP HAVING A BUS TOPOLOGY

CROSS-REFERENCE TO RELATED APPLICATION

This application discloses subject matter related to the subject matter disclosed in the following commonly owned co-pending patent applications: (i) "Wide Tuning Range Fiber Bragg Grating Filter (FBGF) Using Muscle Wire," filed Dec. 28, 1999, Ser. No.: 09/473,754 (Attorney Docket Number 1285-0001), in the name(s) of: Lawrence E. Foltzer; (ii) "Wide Tuning Range Acousto-Optical Fiber Bragg Grating Filter (FBGF)," filed Jul. 17, 2000, Ser. No.: 09/617,576 (Attorney Docket Number 1285-0022), in the name(s) of: Lawrence E. Foltzer; and (iii) "Wavelength Agile Optical Transponder For Bi-Directional, Single Fiber WDM System Testing," filed Dec. 14, 2000, Ser. No.: 09/737,361, in the in the name(s) of: Lawrence E. Foltzer.

BACKGROUND OF THE INVENTION

1. Technical Field of the Invention

The present invention relates to local loop technologies. More particularly, and not by way of any limitation, the present invention is directed to a multi-channel, multi-mode redundant optical local loop having a bus topology implemented with a pair of optical fibers.

2. Description of Related Art

As networks face increasing bandwidth demand and diminishing fiber availability in the existing fiber plant, network providers are migrating towards a new network technology called the optical network. Optical networks are high-capacity telecommunications networks comprised of optical and opto-electronic technologies and components, and provide wavelength-based services in addition to signal routing, grooming, and restoration at the wavelength level. These networks, based on the emergence of the so-called optical layer operating entirely in the optical domain in transport networks, can not only support extraordinary capacity (up to terabits per second (Tbps)), but also provide reduced costs for bandwidth-intensive applications such as the Internet, interactive video-on-demand and multimedia, and advanced digital services.

Of the several key enabling technologies necessary for the successful deployment of optical networks, Wavelength Division Multiplexing (WDM) technique has emerged as a crucial component for facilitating the transmission of diverse payloads regardless of their bit-rate and format over the optical layer. WDM increases the capacity of embedded fiber by first assigning incoming optical signals to specific wavelengths within a designated frequency band (i.e., channels separated by a predetermined spacing) and then multiplexing the resulting signals out onto a single fiber. Because incoming signals are not terminated in the optical layer, the interface is bit-rate and format independent, allowing service/network providers to integrate the WDM technology with existing equipment in the network.

By combining multiple optical signals using WDM, they can be amplified as a group and transported over a single fiber to increase capacity in a cost-effective manner. Each signal carried can be at a different rate (e.g., Optical Carrier (OC)-3, OC-12, OC-48, etc.) and in a different format (e.g., Synchronous Optical Network (SONET) and its companion Synchronous Digital Hierarchy (SDH), Asynchronous Transfer Mode (ATM), Internet Protocol (IP)-based data or multimedia, et cetera).

Current advances in WDM technologies allow a plurality of wavelengths to be multiplexed over a fiber using nanometer and sub-nanometer spacing (Dense WDM or DWDM). For example, up to 32 channels or carriers may be spaced 100 GHz apart (equal to 0.8 nm) in a multiplexed optical signal operating at around 1550 nm. In contrast, some of the standardized, "coarse" wavelength separations include 200 GHz spacing (1.6 nm) and 400 GHz spacing (3.2 nm), both at around 1550 nm.

In order to fully utilize the capabilities of an optical network and to overcome what is commonly referred to as the "last mile problem" in the telecommunications art, optical access from end users, i.e., homes, offices, other buildings, etc., to the network is necessary. Whereas several access architectures such as Fiber To The Curb (FTTC), Fiber To The Home (FTTH), Fiber To The Building (FTTB) and the like have been proposed, the existing solutions for implementing such architectures are beset with various deficiencies and shortcomings.

For example, in current Passive Optical Network (PON) systems used for implementing an optical access network, an Optical Line Termination (OLT) unit is usually located in a local exchange and is connected to a plurality of Optical Network Units (ONUs) through a point-to-multipoint network comprised of fiber cables, splitters and other passive components. Thus, the PON access system is based on a "star" topology which requires more fiber, particularly if redundancy is desired, thereby increasing the cost of the fiber plant. Moreover, any service upgrade beyond the initial capacity in an existing PON access system requires a major overhaul, causing service disruption and possibly widespread outage during system reconfiguration.

Another optical access solution available today is based on the ring topology. Those skilled in the art should readily appreciate that the optical ring topology a variant of the traditional Add/Drop Multiplexing (ADM) telephony technology and requires additional fiber to close the loop and provide an upstream data path. Consequently, the ring topology is also expensive in terms of the fiber plant needed.

Based upon the foregoing, it should be apparent that there has arisen an acute need for an access network solution that reduces the cost of deploying FTTC/FTTH/FTTB systems and fiber transmission infrastructure for an optical local loop. It would be of additional benefit to provide for the capability to detect fiber breakage or localized electro-optical failures in order to minimize or eliminate downtime caused thereby. Furthermore, it would be particularly advantageous if such a solution is capable of providing a transparent (i.e., non-service affecting) method for service upgrading on a per node basis.

SUMMARY OF THE INVENTION

Accordingly, the present invention advantageously provides an optical local loop having a bus topology with a pair of optical fibers disposed among a plurality of Optical Network Units (ONUs). One of the optical fibers provides a main or primary optical path while the other optical fiber is operable as a standby or secondary optical path. A Host Digital Terminal (HDT) is disposed at the head end of the optical local loop for concentrating optical signals for a network. A pair of receiver banks and a pair of transmitter banks are provided within the HDT for operating with the optical signals effectuated at a plurality of wavelengths which are multiplexed and de-multiplexed via a pair of Wavelength Division Multiplex (WDM) couplers disposed on corresponding optical fibers. The WDM coupler and associated optical fiber of an optical path may be optimized for operation around 1310 nm or 1550 nm bands. During transmission, the ONU nodes excite both optical fibers of the local loop and the received optical signals are monitored in the HDT for quality and integrity of the redundant optical paths. The monitoring mechanism is also operable to detect a fault or a potential fault associated with either of the optical paths. Further, such faults or potential faults can be isolated and localized for troubleshooting. A selectively actuatable mechanism provided in the HDT is operable to switch downstream transmission to the ONU nodes from one optical path to the other optical path of the local loop based on the path quality and integrity.

In one exemplary embodiment, each ONU is operable at a select wavelength and is comprised of a first circulator coupled to one optical fiber and a second circulator coupled to the other optical fiber. An optical filter is associated with each circulator for selecting the operating wavelength of the particular ONU. The receiving and transmitting units of the ONU are coupled to the circulators via an optical coupler having a 3 dB separation. In another exemplary embodiment, one or more ONUs are capable of operating at multiple wavelengths. A tunable filter is operably associated with each of the circulators in order to select among multiple wavelengths for a particular ONU node. These filters may be selected from the group consisting of fiber Bragg gratings, wavelength separators using interference filters and Fabry-Perot filters, et cetera.

In one aspect, the present invention is directed to an optical local loop comprising an HDT operable to transmit in a downstream direction on a pair of optical fibers coupled thereto, wherein at least one ONU node is coupled to the optical fiber pair. Preferably, the ONU node is operable to receive and transmit optical signals in at least one wavelength. A first receiver block disposed in the HDT is operable for receiving optical signals excited on a first fiber of the optical fiber pair. In analogous fashion, a second receiver block is disposed in the HDT for receiving optical signals on a second fiber of the optical fiber pair. A monitor is coupled to both first and second receiver blocks for monitoring the quality and integrity of the optical fiber pair based on the received optical signals emanating from the ONU nodes. Accordingly, protection switching may be effectuated transparently (i.e., without affecting or disrupting service) from one optical path to the other path when faults or potential problems are detected on a particular optical fiber path.

In another aspect, the present invention is directed to a method of evaluating integrity in an optical local loop arranged as bus having a pair of optical fibers, wherein a plurality of ONU nodes are disposed downstream from an HDT. During transmission, the ONU nodes are operable to transmit on both fibers of the local loop. A first receiver block in the HDT receives a first set of optical signals on a first optical path of the optical fiber pair, the optical signals being generated by the plurality of nodes disposed on the first optical path. Similarly, a second receiver block in the HDT receives a second set of optical signals on a second optical path of the local loop, wherein the second set of optical signals are generated by the same nodes disposed on the second optical path. Path quality and integrity are monitored by comparing the first and second set of optical signals, wherein loss of a particular wavelength from a select ONU node on one of the optical paths is indicative of fiber breakage or a localized electro-optical failure with respect to that path.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
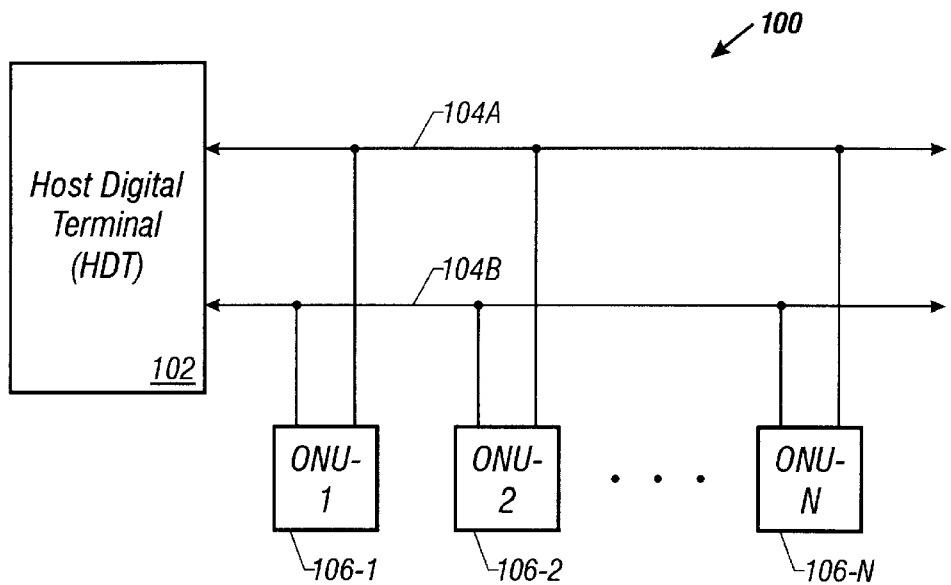
FIG. 1 depicts an exemplary embodiment of an optical local loop provided in a bus topology in accordance with the teachings of the present invention.

In the drawings, like or similar elements are designated with identical reference numerals throughout the several views thereof, and the various elements depicted are not necessarily drawn to scale. Referring now to FIG. 1, depicted therein is an exemplary embodiment of an optical local loop 100 provided in a bus topology in accordance with the teachings of the present invention. A pair of optical or optic fibers, comprised of first and second optical fibers 104A and 104B, respectively, are disposed among one or more Optical Network Units (ONUs or ONU nodes) in a linear data bus-like arrangement for carrying optical signals (representative of voice, video, data, multimedia, graphics, and other information) in upstream and downstream directions. For instance, ONU-1 106-1 through ONU-N 106-N are exemplified in this FIG., wherein each ONU node is operable to receive and transmit optical signals in one or more wavelengths (i.e., channels) in a suitable optical transmission band located at about, for example, 850, 1310 and 1550 nm. In an exemplary implementation, the ONU nodes may be provided as "curbside" entities capable of converting between optical signals and signals carrying appropriate information, e.g., telephony, video, data, etc. provided to or received from end users (i.e., houses, offices, etc.).

A Host Digital Terminal (HDT) 102 is coupled at the head end of the optical fibers 104A and 104B for providing an interface between the optical local loop and a network. For example, HDT 102 may be interfaced with telephony switching equipment (not shown) of an end office (EO) disposed in the Public Switched Telephony Network (PSTN), or with appropriate TV cable or satellite networks, or may be provided as a Point-of-Presence (POP) access node in an optical network. As will be described in greater detail hereinbelow, HDT 102 is operable to receive and transmit optical signals over the optical paths provided by the fibers 104A and 104B in a fail-safe manner by switching between them based on the quality and integrity of the optical paths.

Figure 2:
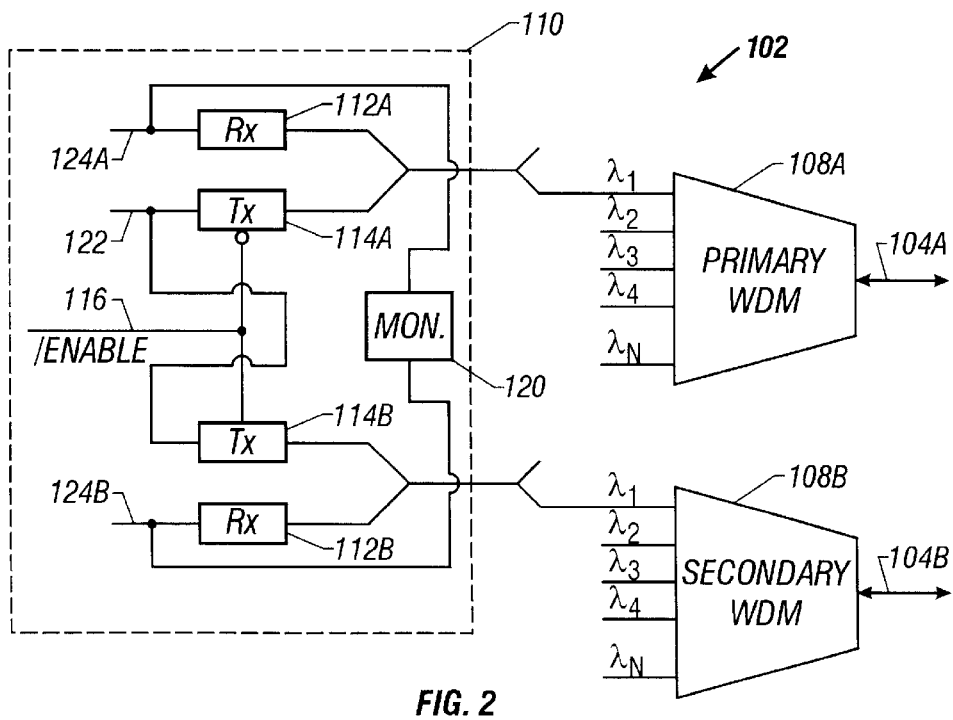
FIG. 2 depicts an exemplary embodiment of a Host Digital Terminal (HDT) operable within the optical local loop of the present invention.

FIG. 2 depicts additional details of HDT 102 operable within the optical local loop of the present invention. Each of the optical fibers 104A, 104B is coupled to a Wavelength Division Multiplex (WDM) coupler (reference numerals 108A and 108B, respectively) for multiplexing downstream optical signals towards the ONU nodes 106-1 through 106-N (shown in FIG. 1) and for de-multiplexing upstream optical signals received therefrom. Each WDM coupler is accordingly operable with a plurality of wavelengths, e.g., $\lambda_1$ through $\lambda_N$, within a particular optical transmission band such as the 1310 nm band or 1550 nm band.

In accordance with the teachings of the present invention, a bank of redundant transceiver sets are provided for each of the specific operating wavelengths of the optical local loop. For example, transceiver set 110 is particularly illustrated with respect to $\lambda_1$ wavelength, wherein a receiver block and a transmitter block associated with the optical signal of that wavelength are provided for each of the redundant optical paths of the local loop. Thus, receiver 112A and transmitter 114A operable at the $\lambda_1$ wavelength are provided with respect to the optical fiber path 104A. In similar fashion, receiver 112B and transmitter 114B operable at the $\lambda_1$ wavelength are provided for the optical fiber path 104B. It should be appreciated that each transceiver set operating on a particular wavelength targeted towards at least one ONU node forms a Frequency Division Multiplex (FDM) virtual channel structure within the optical local loop respect to that ONU node. As N wavelengths are illustrated herein, a corresponding N number of transceiver sets are thus provided in HDT 102 although only one is specifically depicted in FIG. 2.

Continuing to refer to FIG. 2, suitable opto-electronics are provided at the receiver and transmitter blocks of the transceiver sets of HDT 102 for signal reception, transmission, conversion, shaping, processing, analysis, et cetera. Further, the optical signals received at each receiver block of transceiver set 110 are provided to a monitor 120 for comparing and analyzing the upstream signals received on the both optical paths of the local loop. The monitoring structure 120 is thus operable to identify the relative signal strengths of a particular wavelength emanating from the downstream ONU node(s) such that localized electro-optical failures or fiber breakage (causing "silent failures") of the optical paths can be advantageously detected.

Those skilled in the art should appreciate that the received signals at each transceiver set may also be provided to a "centralized" monitoring structure within HDT 120 for evaluating the path quality and integrity in order to facilitate protection switching between the optical fibers 104A and 104B. Furthermore, the ONUs can generate signals to the monitoring structure with respect to performance degradation in the downstream path so that corrective action can be taken before a potentially service-affecting failure occurs.

In order to facilitate error monitoring, the signal paths from the redundant receiver blocks are maintained separately. For instance, separate signal paths 124A and 124B are exemplified for the receiver blocks 112A and 112B of the transceiver set 110. On the other hand, a coupled signal path 122 is provided to the transmitter blocks 114A and 114B of the transceiver set 110. Only one of the transmitter blocks is rendered active by means of an active low ENABLE signal (/ENABLE) 116 provided to the transmitter blocks. In the exemplary embodiment shown, when /ENABLE 116 is asserted low, transmitter 114A is active and operable for transmission of signals received from the network to the corresponding WDM coupler 108A for multiplexing with other signals. Accordingly, by providing a feedback signal from the path integrity monitor structure of HDT 102 to the signal generator of the /ENABLE signal 116, only one of the optical fiber paths may be rendered active for downstream signal transmission. When a failure or potential performance degradation is detected on the active optical path as set forth hereinabove, protection switching is effectuated by controlling the /ENABLE signal 116 (i.e, selective actuation) such that signal transmission takes place on the other (i.e., standby) optical path.

Figure 3:
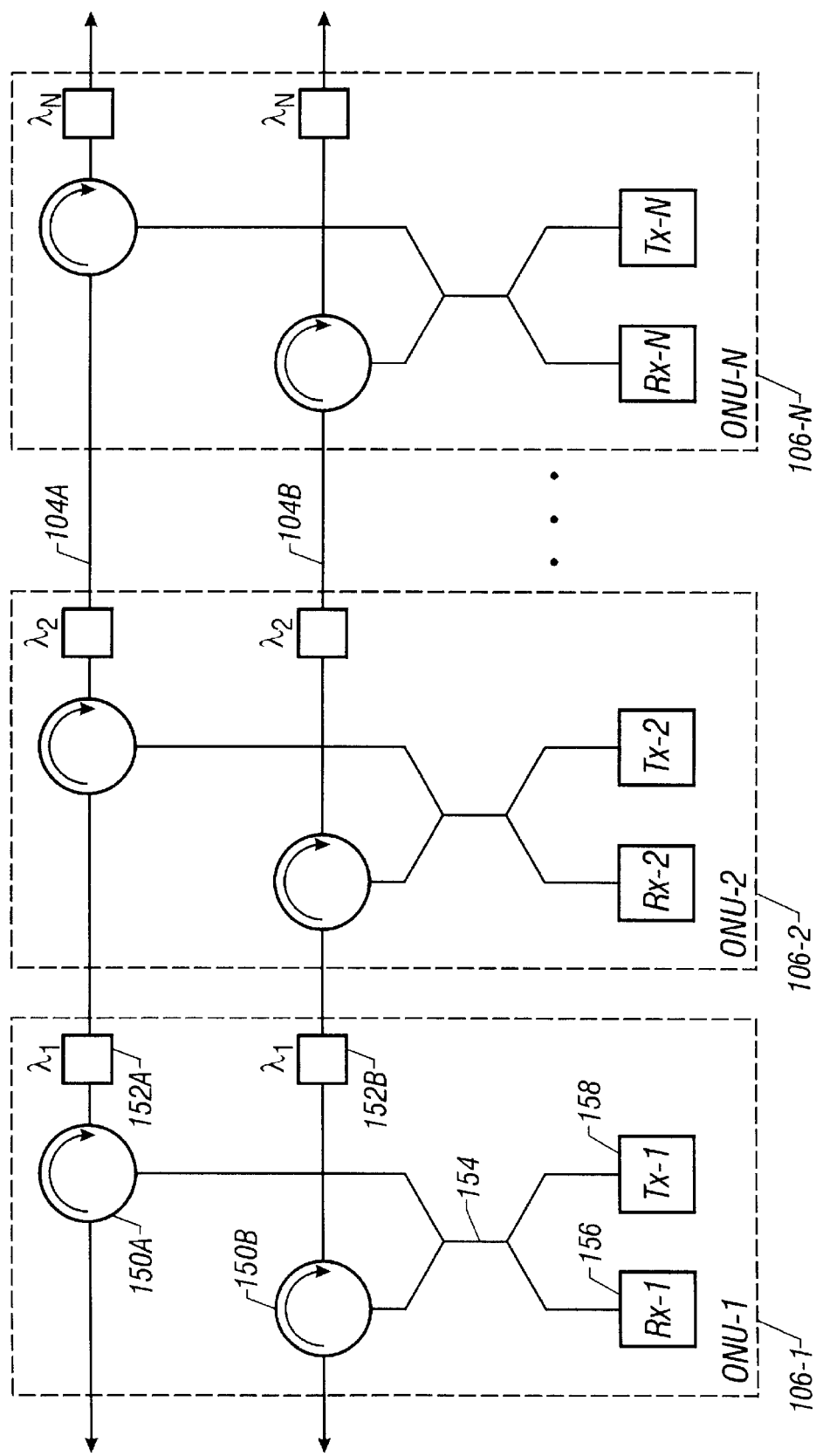
FIG. 3 depicts an exemplary embodiment of the Optical Network Units (ONUs) operable with the optical local loop of the present invention.

Referring now to FIG. 3, depicted therein is an exemplary embodiment of the ONUs 106-1 through 106-N operable with the optical local loop of the present invention. In this exemplary embodiment, each ONU is provided to be operable at a specific wavelength (i.e., optical channel) in the appropriate optical transmission band and is capable of exciting both optical fibers 104A and 104B for sending optical signals at the selected wavelength. For instance, ONU 106-1 is operable at $\lambda_1$, ONU 106-2 at $\lambda_2$, and so on. While common to the ONUs shown in FIG. 3, the description of ONU 106-1 is set forth immediately hereinbelow with particular detail.

A pair of circulators 150A and 150B are provided at ONU 106-1 for operating in conventional manner with respect to the optical fibers 104A and 104B, respectively. Associated with each circulator is an optical filter (e.g., selected from the group comprising fiber Bragg grating filters, wavelength separators using interference filters and Fabry-Perot filters, and the like) tuned to the operating wavelength of the ONU. Optical filters 152A and 152B are accordingly illustrated for selecting the $\lambda_1$ wavelength for the ONU. An optical coupler 154 (preferably a 3 dB coupler) is coupled to the optical paths emanating from the optical circulators 150A and 150B for splitting the transmission and reception paths. A local receiver (RX-1) 156 provided at the ONU is coupled to the optical coupler 154 whereby optical signals of the operating wavelength are received from the head end. In similar fashion, a local transmitter (TX-1) 158 provided at ONU 106-1 is operable to generate optical signals at the $\lambda_1$ wavelength which are injected into the fibers 104A and 104B for upstream transmission.

Figure 4:
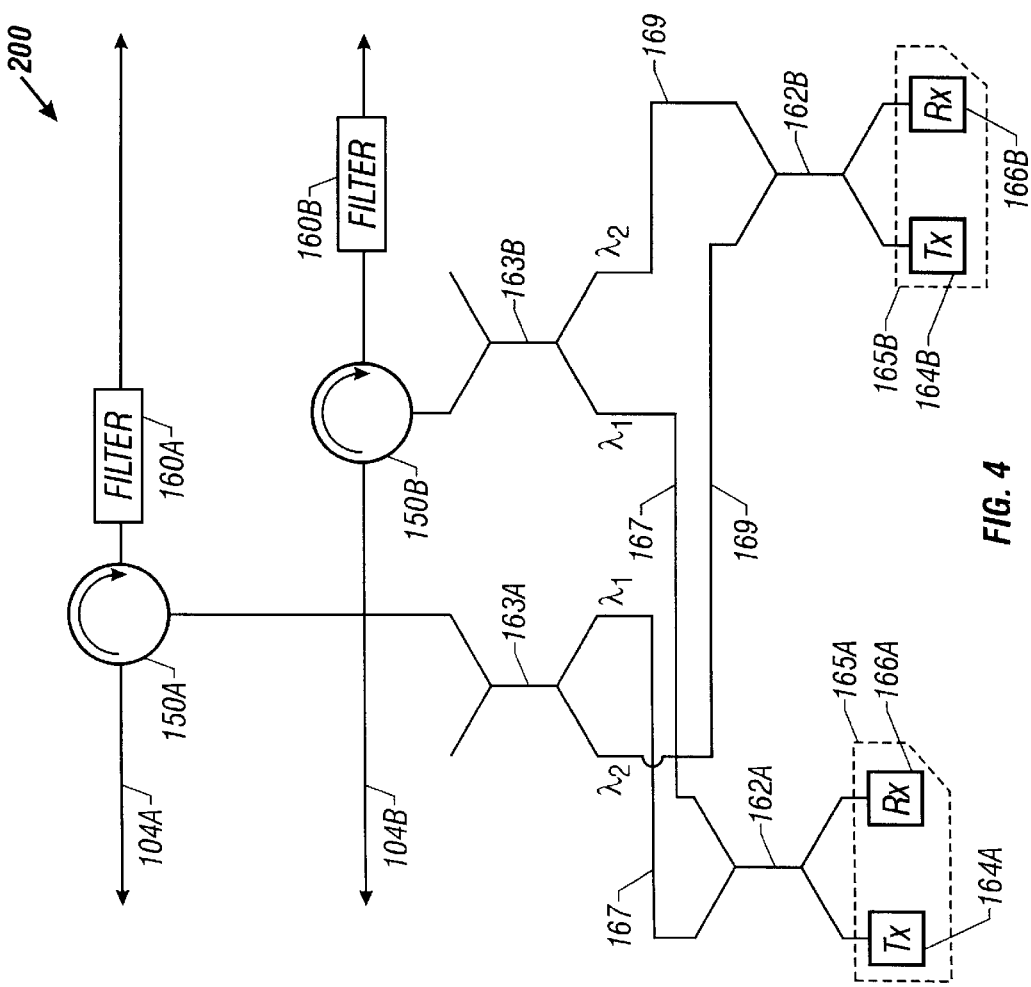
FIG. 4 depicts an exemplary embodiment of a multi-wavelength ONU operable with the optical local loop of the present invention.

FIG. 4 depicts an exemplary embodiment of a multi-wavelength ONU 200 operable with the optical local loop of the present invention. Those skilled in the art should recognize upon reference hereto that the multi-wavelength ONU 200 is essentially similar to the single-wavelength ONUs described hereinabove. Associated with each of the two optical paths 104A, 104B of the local loop is a corresponding optical circulator and tunable filter combination. In the exemplary embodiment shown, optical circulator 150A and tunable filter 160A are coupled to the optical fiber path 104A and, in similar fashion, optical circulator 150B and tunable filter 160B are disposed on the optical fiber path 104B. The tunable filters are operable to select among the multiple wavelengths at which the ONU 200 is capable of operating. In some exemplary embodiments, such tunable filters may be comprised of "inherent" fiber Bragg grating filters, tunable gratings attached to muscle wires, acoustically-tuned filters and the like, such as those described in the following commonly owned co-pending patent applications which have been cross-referenced hereinabove and are incorporated by reference herein: (i) "Wide Tuning Range Fiber Bragg Grating Filter (FBGF) Using Muscle Wire," filed Dec. 28, 1999, Ser. No.: 09/473,754 (Attorney Docket Number 1285-0001), in the name(s) of: Lawrence E. Foltzer; and (ii) "Wide Tuning Range Acousto-Optical Fiber Bragg Grating Filter (FBGF)," filed Jul. 17, 2000, Ser. No.: 09/617,576 (Attorney Docket Number 1285-0022), in the name(s) of: Lawrence E. Foltzer.

Optical paths from each of the circulators are provided to a corresponding local WDM coupler for multiplexing and de-multiplexing the optical signals at multiple wavelengths in a suitable transmission band. WDM couplers 163A and 163B operable for two wavelengths, $\lambda_1$ and $\lambda_2$, are exemplified. Optical paths operable to carry signals of one single wavelength are disposed between the WDM couplers and a plurality of 3 dB optical coupler/splitter units depending upon the number of operating wavelengths of the multi-wavelength ONU. For example, optical paths 167 carrying the $\lambda_1$ wavelength signals are disposed between the WDMs 163A, 163A and splitter/coupler 162A. In similar fashion, optical paths 169 carrying the $\lambda_2$ wavelength signals are disposed between the WDMs 163A, 163B and splitter/coupler 162B. Each optical splitter/coupler unit is associated with a corresponding local transceiver unit operating at a specific wavelength (e.g., transceivers 165A and 165B, wherein transceiver 165A is operable at $\lambda_1$ and includes receiver 166A and transmitter 164A, and transceiver 165B is operable at $\lambda_2$ and includes receiver 166B and transmitter 164B).

Figure 5:
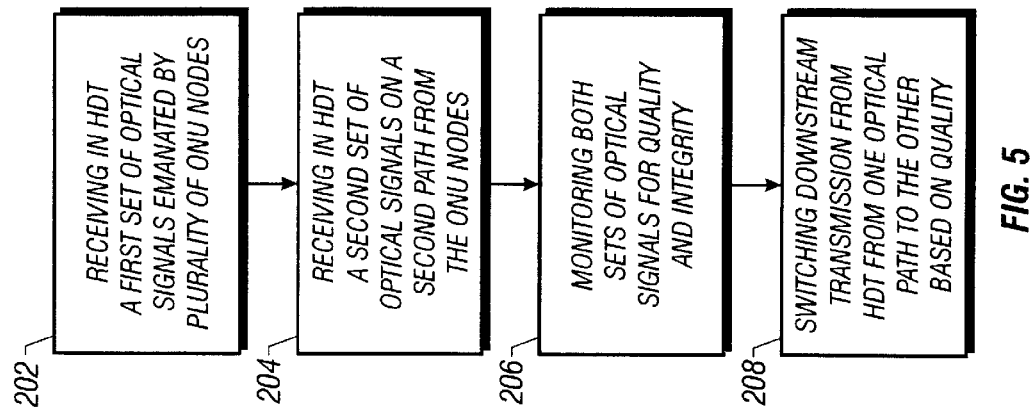
FIG. 5 is a flow chart of the steps for evaluating the quality and integrity of the optical paths of the local loop provided in accordance with the teachings of the present invention.

FIG. 5 is a flow chart of the steps for evaluating the quality and integrity of the optical paths of the local loop provided in accordance with the teachings of the present invention. One of the two optical fiber paths of the local loop is initially operable as the primary optical path, with the other path being the standby or redundant path for the time being. As set forth hereinabove, the downstream ONU nodes are operable to excite both fibers for upstream transmission to the head end. Upon receiving in the HDT a first set of optical signals from the ONUs on the primary path (step 202) and a second set of optical signals from the ONUs on the standby path (step 204) during normal operations of the local loop, the monitoring structure provided in the HDT is operable to determine the quality/integrity of the fiber paths by evaluating the ONU transmissions (step 206). Single point failures, localized electro-optical failures, fiber breakage faults and the like are thus detected by the monitoring process with respect to the primary and redundant optical fibers of the local process. When a fault or quality degradation is detected, protection switching may be effectuated depending upon whether the primary or redundant path is involved (step 208), whereby optical transmissions from the HDT to downstream ONU nodes is switched from one optical path to the other path based on quality, integrity, performance, signal strength, etc.

Based upon the foregoing Detailed Description, it should be readily apparent that the present invention provides an innovative optical local loop solution that advantageously overcomes the shortcomings and deficiencies of the conventional optical loop solutions such as the passive optical network (PON)-based star topologies and ring topology-based loops. The bus-like linear topology of the optical local loop of the present invention not only reduces the cost of deploying FTTC, FTTH, or FTTB systems and fiber transmission infrastructure but also provides protection switching against various failures in order to minimize downtime. Moreover, the present invention's optical local loop provides a transparent method for service upgrade (i.e., not affecting other nodes on other channels) on a per node basis.

Further, it is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims.

What is claimed is:

1. An optical local loop, comprising:
   a host digital terminal (HDT) operable to transmit a plurality of wavelengths in a downstream direction on a pair of optical fibers coupled thereto;
   one or more nodes coupled to said pair of optical fibers, wherein each of the nodes is operable to receive a different one of the plurality of wavelengths transmitted by the HDT and to transmit such wavelength back to the HDT on the pair of optical fibers;
   a first set of receivers disposed in said HDT, each for receiving a different one of the plurality of wavelengths on a first fiber of said pair of optical fibers corresponding to a particular node;
   a second set of receivers disposed in said HDT, each for receiving a different one of the plurality of wavelengths on a second fiber of said pair of optical fibers corresponding to a particular node; and
   a monitor coupled to said first and second set of receivers for comparing each one of the plurality of wavelengths transmitted by a particular node to the HDT on said first fiber to each one of the plurality of wavelengths transmitted by a particular node to the HDT on said second fiber.

2. The optical local loop as set forth in claim 1, wherein said HDT comprises a first wavelength-division multiplex (WDM) coupler coupled to said first fiber and a second WDM coupler coupled to said second fiber, each of said first and second WDM couplers operating to multiplex and de-multiplex the plurality of wavelengths for transmitting and receiving said optical signals on said first and second optical fibers.

3. The optical local loop as set forth in claim 2, further comprising means for selectively activating one of said first and second optical fibers for downstream transmission from said HDT.

4. The optical local loop as set forth in claim 3, wherein each of said one or more nodes comprises:
   a first optical circulator coupled to said first optical fiber, said first optical circulator operating with a filter for selecting optical signals at a select wavelength;
   a second optical circulator coupled to said second optical fiber, said second circulator operating with a filter for selecting optical signals at a select wavelength; and
   a coupler for coupling optical signals at said select wavelength to and from a local receiver and transmitter, respectively, disposed at said at least one node.

5. The optical local loop as set forth in claim 4, wherein each of said filters comprises a fiber Bragg grating filter.

6. The optical local loop as set forth in claim 4, further comprising means for detecting a fault associated with one of the plurality of wavelengths transmitted by a particular node to the HDT on said pair of optical fibers, said means operating in association with said monitor.

7. The optical local loop as set forth in claim 4, further comprising means for isolating a fault associated with said pair of optical fibers, said means operating in association with said monitor.

8. The optical local loop as set forth in claim 4, further comprising means for localizing a fault associated with said pair of optical fibers, said means operating in association with said monitor.

9. A method of evaluating integrity in an optical local loop arranged as bus having a pair of optical fibers, comprising the steps of:
   receiving in a host digital terminal (HDT) a first set of optical signals on a first optical path of said pair of optical fibers, wherein each of said first set of optical signals are generated by one of a plurality of corresponding nodes disposed on said first optical path;
   receiving in said HDT a second set of optical signals on a second optical path of said pair of optical fibers, wherein each of said second set of optical signals are generated by one of the plurality of corresponding nodes disposed on said second optical path; and comparing each signal in said first and second set of optical signals corresponding to one of the plurality of nodes to identify at least a potential problem with respect to at least one of said first and second optical paths.

10. The method of evaluating integrity in an optical local loop arranged as bus having a pair of optical fibers as set forth in claim 9, wherein said first set of optical signals are processed through a first wavelength division multiplex (WDM) coupler connected to said first optical path in said HDT.

11. The method of evaluating integrity in an optical local loop arranged as bus having a pair of optical fibers as set forth in claim 10, wherein said second set of optical signals are processed through a second WDM coupler connected to said second optical path in said HDT.

12. The method of evaluating integrity in an optical local loop arranged as bus having a pair of optical fibers as set forth in claim 11, wherein each of said plurality of nodes is operable at a select wavelength.

13. The method of evaluating integrity in an optical local loop arranged as bus having a pair of optical fibers as set forth in claim 11, wherein said first WDM coupler is operable at around 1550 nm.

14. The method of evaluating integrity in an optical local loop arranged as bus having a pair of optical fibers as set forth in claim 11, wherein said second WDM coupler is operable at around 1550 nm.

15. The method of evaluating integrity in an optical local loop arranged as bus having a pair of optical fibers as set forth in claim 11, wherein said first WDM coupler is operable at around 1310 nm.

16. The method of evaluating integrity in an optical local loop arranged as bus having a pair of optical fibers as set forth in claim 11, wherein said second WDM coupler is operable at around 1310 nm.

17. The method of evaluating integrity in an optical local loop arranged as bus having a pair of optical fibers as set forth in claim 11, wherein at least one of said plurality of nodes is operable at multiple wavelengths.

18. The method of evaluating integrity in an optical local loop arranged as bus having a pair of optical fibers as set forth in claim 11, further including the step of isolating said at least a potential problem with respect to at least one of said first and second optical paths.

19. The method of evaluating integrity in an optical local loop arranged as bus having a pair of optical fibers as set forth in claim 11, further including the step of localizing said at least a potential problem with respect to at least one of said first and second optical paths.

20. A host digital terminal in an optical bus network, comprising:
    a first multiplexer for multiplexing and demultiplexing a plurality of wavelengths, wherein different subsets of the plurality of wavelengths are transmitted from a different one of a plurality of nodes on a first optical fiber;
    a second multiplexer for multiplexing and demultiplexing a plurality of wavelengths, wherein different subsets of the plurality of wavelengths are transmitted from a different one of the plurality of nodes on a second optical fiber;
    a bank of transceivers, wherein each transceiver is connected to the first and second multiplexers for processing a different subset of the plurality of wavelengths corresponding to a different one of the plurality of nodes and comprises:
    a primary transmitter and receiver connected to the first multiplexer;
    a secondary transmitter and receiver connected to the second multiplexer;
    a monitor that compares signal quality of the subset of the plurality of wavelengths received from the first and second multiplexer; and
    a switch operable to select transmission by either the primary or the secondary transmitter in response the signal quality detected by the monitor.

21. The host digital terminal of claim 20, wherein the different subsets of the plurality of wavelengths includes one wavelength.

22. The host digital terminal of claim 20, wherein the different subsets of the plurality of wavelengths includes multiple wavelengths.

* * * * *